United States Patent
Yasui et al.

(10) Patent No.: US 9,221,442 B2
(45) Date of Patent: Dec. 29, 2015

(54) BRAKE CONTROL APPARATUS FOR VEHICLE

(71) Applicants: Yoshiyuki Yasui, Nagoya (JP); Hiroyuki Kodama, Kariya (JP); Naotoshi Satake, Nagoya (JP)

(72) Inventors: Yoshiyuki Yasui, Nagoya (JP); Hiroyuki Kodama, Kariya (JP); Naotoshi Satake, Nagoya (JP)

(73) Assignee: ADVICS CO., LTD., Kariya-Shi, Aichi (JP)

( * ) Notice: Subject to any disclaimer, the term of this patent is extended or adjusted under 35 U.S.C. 154(b) by 0 days.

(21) Appl. No.: 14/369,243

(22) PCT Filed: Dec. 25, 2012

(86) PCT No.: PCT/JP2012/083442
§ 371 (c)(1),
(2) Date: Dec. 8, 2014

(87) PCT Pub. No.: WO2013/099851
PCT Pub. Date: Jul. 4, 2013

(65) Prior Publication Data
US 2015/0112565 A1 Apr. 23, 2015

(30) Foreign Application Priority Data
Dec. 27, 2011 (JP) .................... 2011-284591

(51) Int. Cl.
*G06F 7/70* (2006.01)
*G06F 19/00* (2011.01)
(Continued)

(52) U.S. Cl.
CPC ............... *B60T 8/3255* (2013.01); *B60T 7/042* (2013.01); *B60T 8/171* (2013.01); *B60T 8/172* (2013.01);
(Continued)

(58) Field of Classification Search
CPC ......... B60T 8/1755; B60T 8/172; B60T 7/22; B60W 10/184; B60W 10/18
USPC ............................................................ 701/70
See application file for complete search history.

(56) References Cited

U.S. PATENT DOCUMENTS

2005/0046368 A1  3/2005  Arakawa et al.

FOREIGN PATENT DOCUMENTS

EP  1 695 887 A1  8/2006
JP  2002-225690 A  8/2002
(Continued)

OTHER PUBLICATIONS

International Search Report (PCT/ISA/210) mailed on Mar. 19, 2013, by the Japanese Patent Office as the International Searching Authority for International Application No. PCT/JP2012/083442.
(Continued)

*Primary Examiner* — Maceeh Anwari
(74) *Attorney, Agent, or Firm* — Buchanan Ingersoll & Rooney PC

(57) ABSTRACT

Electric motor control is based on a target energization amount calculated using a braking operation member operation amount. A state quantity is acquired as an actual value, indicating an actual actuation state of a movable member located in a power transmission path from the electric motor to a friction member. Using the operation amount, it is determined whether or not inertia compensation control is necessary, which compensates for the inertia influence of a brake actuator during electric motor deceleration. "A target value corresponding to the actual value" is determined as a reference value, which is calculated based on the operation amount at a time when inertia compensation control is necessary. Based on the actual and reference values, "an inertia compensation energization amount for decreasing the target energization amount to compensate for the influence of inertia" is calculated, and the target energization amount is adjusted using the inertia compensation energization amount.

7 Claims, 8 Drawing Sheets

(51) Int. Cl.
*G06G 7/00* (2006.01)
*G06G 7/76* (2006.01)
*B60T 8/32* (2006.01)
*B60T 7/04* (2006.01)
*B60T 13/74* (2006.01)
*B60T 17/22* (2006.01)
*F16D 65/18* (2006.01)
*B60T 8/171* (2006.01)
*B60T 8/172* (2006.01)
*F16D 66/00* (2006.01)
*F16D 125/40* (2012.01)
*F16D 125/48* (2012.01)

(52) U.S. Cl.
CPC .............. *B60T 13/741* (2013.01); *B60T 17/22* (2013.01); *F16D 65/18* (2013.01); *F16D 2066/005* (2013.01); *F16D 2125/40* (2013.01); *F16D 2125/48* (2013.01)

(56) References Cited

FOREIGN PATENT DOCUMENTS

| | | |
|---|---|---|
| JP | 2003-202042 A | 7/2003 |
| JP | 2005-247306 A | 9/2005 |
| WO | 03/054412 A1 | 7/2003 |

OTHER PUBLICATIONS

Written Opinion (PCT/ISA/237) mailed on Mar. 19, 2013, by the Japanese Patent Office as the International Searching Authority for International Application No. PCT/JP2012/083442 (with English language translation, 3 pages).

European Communication and Supplemental Search Report dated Jul. 24, 2015 issued in the corresponding European Patent Application No. 12863491.2-1756 (6 pages).

BRAKE CONTROL APPARATUS FOR VEHICLE

TECHNICAL FIELD

The present invention relates to a vehicle brake control device.

BACKGROUND ART

Hitherto, there has been known a vehicle brake control device configured to generate a braking torque by an electric motor. In this type of device, typically, an indicator current (target current) is calculated based on an operation amount of a braking operation member for the vehicle by a driver, and the electric motor is controlled based on the indicator current. Then, a braking torque that depends on the operation of the braking operation member is applied to the wheels.

In the device of this type, due to influences of the inertia (inertia moment, inertia mass) of the entire device including the inertia of the electric motor, particularly in a case of abrupt braking (upon rapid increase of braking torque) or the like, a response delay of the braking torque (a delay of rise thereof) may occur in acceleration during which the rotation speed of the electric motor is increased (for example, when the electric motor is started) and overshoot of the braking torque may occur in deceleration during which the rotation speed of the electric motor is decreased (for example, when the electric motor is intended to be stopped). Therefore, particularly, at abrupt braking, it is desired to compensate for the influences of the inertia, that is, to improve responsiveness (rising performance) of the braking torque during acceleration of the electric motor and to suppress the overshoot of the braking torque during deceleration of the electric motor (improve the convergence).

In order to cope with this problem, for example, Japanese Patent Application Laid-open No. 2002-225690 has the following description. That is, based on a map in which indicator currents and target motor rotation angles are defined, a target motor rotation angle corresponding to the calculated indicator current is determined, and a target motor rotation angular acceleration is calculated by subjecting the target motor rotation angle to the second-order differentiation. Based on the target motor rotation angular acceleration, an inertia compensation current for compensating for the influences of the inertia of the entire device is calculated. In this case, the inertia compensation current is calculated to be a positive value during acceleration of the electric motor, while the inertia compensation current is calculated to be a negative value during deceleration of the electric motor. This inertia compensation current is added to the indicator current, to thereby determine a compensated indicator current (target current). In this manner, the compensated indicator current is calculated to be slightly larger than the indicator current when the electric motor is started so that the responsiveness of the braking torque can be improved. The compensated indicator current is calculated to be slightly smaller than the indicator current when the electric motor is intended to be stopped so that the overshoot of the braking torque can be suppressed.

In addition, Japanese Patent Application Laid-open No. 2002-225690 also describes providing a "gradient limitation" against the indicator current for performing stable control when the indicator current exceeds the capacity of the electric motor. Specifically, by providing a gradient restriction in advance so that at least an gradient of the indicator current does not exceed the capability of the electric motor, the gradient of the indicator current and an actual output value are made to coincide with each other. Alternatively, when the actual output value cannot follow the initially set indicator current, the indicator current and the actual output value are compared to each other. Based on the result of comparison, the gradient of the indicator current is restricted. In this case, a map which defines the relationship between "the indicator current and the actual output value" and "the gradient restriction of the indicator current" is created in advance. Based on the map, the gradient restriction of the indicator current is obtained based on the map from the above-mentioned result of comparison.

SUMMARY OF THE INVENTION

As described above, Japanese Patent Application Laid-open No. 2002-225690 describes that the indicator current and the actual output value are made to coincide with each other by setting the restriction on the gradient of the indicator current (that is, a change amount of the indicator current with respect to time). Here, in inertia compensation control, the inertia compensation current is calculated based on a target motor rotation angular acceleration calculated from the indicator current. Therefore, when the "gradient restriction" is set for the indicator current, the target motor rotation angular acceleration corresponding to a second-order differential value of the indicator current is calculated to be approximately "zero". Therefore, in particular, in the inertia calculation control during deceleration of the electric motor, there may arise some cases where appropriate control is difficult to execute. As a result, overshoot of a braking torque during deceleration of the electric motor cannot be sufficiently suppressed. Thus, further proper compensation for the influences of the inertia described above is desired.

The present invention has been made to cope with the problem described above, and therefore has an object to provide a vehicle brake control device for generating a braking torque by an electric motor, which is capable of properly compensating for the influences of the inertia of the entire device during deceleration of the electric motor.

According to one embodiment of the present invention, there is provided a vehicle brake control device, including: operation amount acquisition means (BPA) for acquiring an operation amount (Bpa) of a braking operation member (BP) for a vehicle by a driver; braking means (BRK) for pressing a friction member (MSB) against a rotating member (KTB) fixed to a wheel (WHL) of the vehicle through intermediation of an electric motor (MTR) to generate a braking torque for the wheel (WHL); control means (CTL) for calculating a target energization amount (Imt) based on the operation amount (Bpa) and controlling the electric motor (MTR) based on the target energization amount (Imt); and acquisition means (SVA, MKA, FBA) for acquiring, as an actual value (Sva, Mka, Fba), a state quantity indicating an actual actuation state of a movable member located in a power transmission path from the electric motor (MTR) to the friction member (MSB).

The present invention has a feature in that the control means (CTL) is configured to: determine, based on the operation amount (Bpa), whether or not inertia compensation control for compensating for the influences of the inertia of the braking means (BRK) during deceleration in which a speed of the electric motor (MTR) decreases is necessary; determine, as a reference value (ref), a target value (Svt, Mkt, Fbt) corresponding to the actual value (Sva, Mka, Fba), the target value being calculated based on the operation amount (Bpa) at a time of the determination that the inertia compensation control is necessary (FLr←1); calculate, based on the actual value (Sva, Mka, Fba) and the reference value (ref), an inertia compensation energization amount (Ikt) for decreasing the target energization amount to compensate for the influences of inertia of the braking means (BRK); and adjust the target energization amount (Imt) based on the inertia compensation energization amount (Ikt).

The inertia compensation control during deceleration (deceleration control) is required to be performed immediately before a motion state of the electric motor which generates a pressing force transitions from a transient state to a steady state. Moreover, the inertia compensation control during deceleration is particularly important when there is a difference between the target value (Fbt, Mkt) for calculating the target energization amount and the actual value (Fba, Mka) generated as a result thereof.

According to the brake control device of the present invention, the target value at the time of determination of the necessary state of the deceleration control is set as the reference value at the time of transition from the transient state to the steady state. Based on the reference value, a timing at which the actual value transitions from the transient state to the steady state can be predicted. Specifically, when the electric motor is decelerated, a timing to start the deceleration control based on the result of comparison between the target value and the actual value is determined. The inertia compensation energization amount Ikt is calculated from the timing to adjust the target energization amount Imt. Therefore, the inertia compensation control with no excess and deficiency in the energization amount may be started and executed at an appropriate timing before the actual value transitions from the transient state to the steady state. As a result, the overshoot and undershoot of the braking torque can be suppressed reliably.

The target value, the actual value, and the reference value are in a common (the same) physical quantity. For example, when a rotation angle of the electric motor is adopted as the physical quantity, a target rotation angle, an actual rotation angle, and a reference rotation angle are used. When a pressing force is adopted, a target pressing force, an actual pressing force, and a reference pressing force are used.

Specifically, the control means (CTL) can be configured to: determine a time point (Tss) to start the inertia compensation control based on a deviation ($\Delta$sv, $\Delta$mk, $\Delta$fb) between the actual value (Sva, Mka, Fba) and the reference value (ref) at a time point when it is determined that the inertia compensation control is necessary (FLr←1); and start the adjustment of the target energization amount (Imt) based on the inertia compensation energization amount (Ikt) when the time point (Tss) to start the inertia compensation control arrives.

In general, the actual value has a time delay with respect to the target value. With the configuration described above, at the time of determination that the inertia compensation control during deceleration is necessary, a timing to start the inertia compensation control is determined based on a difference between the actual value (such as Mka) and the reference value ref. Therefore, in consideration of the time delay described above, the inertia compensation control during deceleration is started. As a result, reliable control with no excess and deficiency in the energization amount can be executed.

Alternatively, the control means (CTL) can be configured to start the adjustment of the target energization amount (Imt) based on the inertia compensation energization amount (Ikt) at a time point when the actual value (Sva, Mka, Fba) exceeds the reference value (ref). As a result, the inertia compensation control is started at a time point when the actual value (such as Mka) reaches the reference value ref. Therefore, the above-mentioned time delay can be reliably compensated for.

In the above-mentioned brake control device according to the present invention, it is preferred that the physical quantity relating to at least one of a position of the movable member or a force acting on the movable member be acquired as the actual value (Sva, Mka, Fba).

A target to be controlled by the braking means is a braking torque on a wheel. Therefore, the "force" acting on the movable member located in a power transmission path from the electric motor (MTR) to the friction member (MSB) can be acquired (detected) as the actual value. Moreover, by using stiffness (spring constant) of the entire braking means, the "force acting on the movable member" can be calculated based on the "position of the movable member". Therefore, the "position" of the movable member can be acquired (detected) as the actual value.

In the above-mentioned brake control device according to the present invention, it is preferred that the target value (Svt, Mkt, Fbt) be determined based on a change pattern (state of change with respect to time) of the actual value (Sva, Mka, Fba), which is acquired in advance in the case where step-input of the target energization amount (Imt) to the electric motor (MTR) is performed.

As described above, the reference value ref is an index serving as a reference for taking the time delay of the actual value (such as Mka) with respect to the target value (such as Mkt) into consideration. With the configuration described above, the target value is calculated based on a step-response of the braking means (that is, a maximum response of the braking means). Therefore, a temporal relationship (relationship in phase difference) between the target value and the actual value can be appropriately maintained.

In the above-mentioned brake control device according to the present invention, it is preferred that a target acceleration value (ddSvt, ddMkt, ddFbt) be calculated by subjecting the target value (Svt, Mkt, Fbt) to second-order differentiation, and the inertia compensation control be determined to be necessary when an absolute value of the target acceleration value (ddSvt, ddMkt, ddFbt) exceeds a predetermined value (ddm1).

As a result, whether or not the deceleration control is necessary is determined based on the target value. Therefore, the appropriate timing to start the deceleration control for the actual value can be predicted. Moreover, the influences of the Inertia are correlated with the acceleration of the movable portion of the device. With the above-mentioned configuration, based on the target acceleration value (such as ddMkt) obtained by the second-order differentiation of the target value, whether or not the inertia compensation control during deceleration is necessary can be appropriately determined.

DESCRIPTION OF EMBODIMENTS

Now, a vehicle brake control device according to embodiments of the present invention is described with reference to the drawings.

<Overall Configuration of Vehicle Equipped with Vehicle Brake Control Device of the Present Invention>

Figure 1:
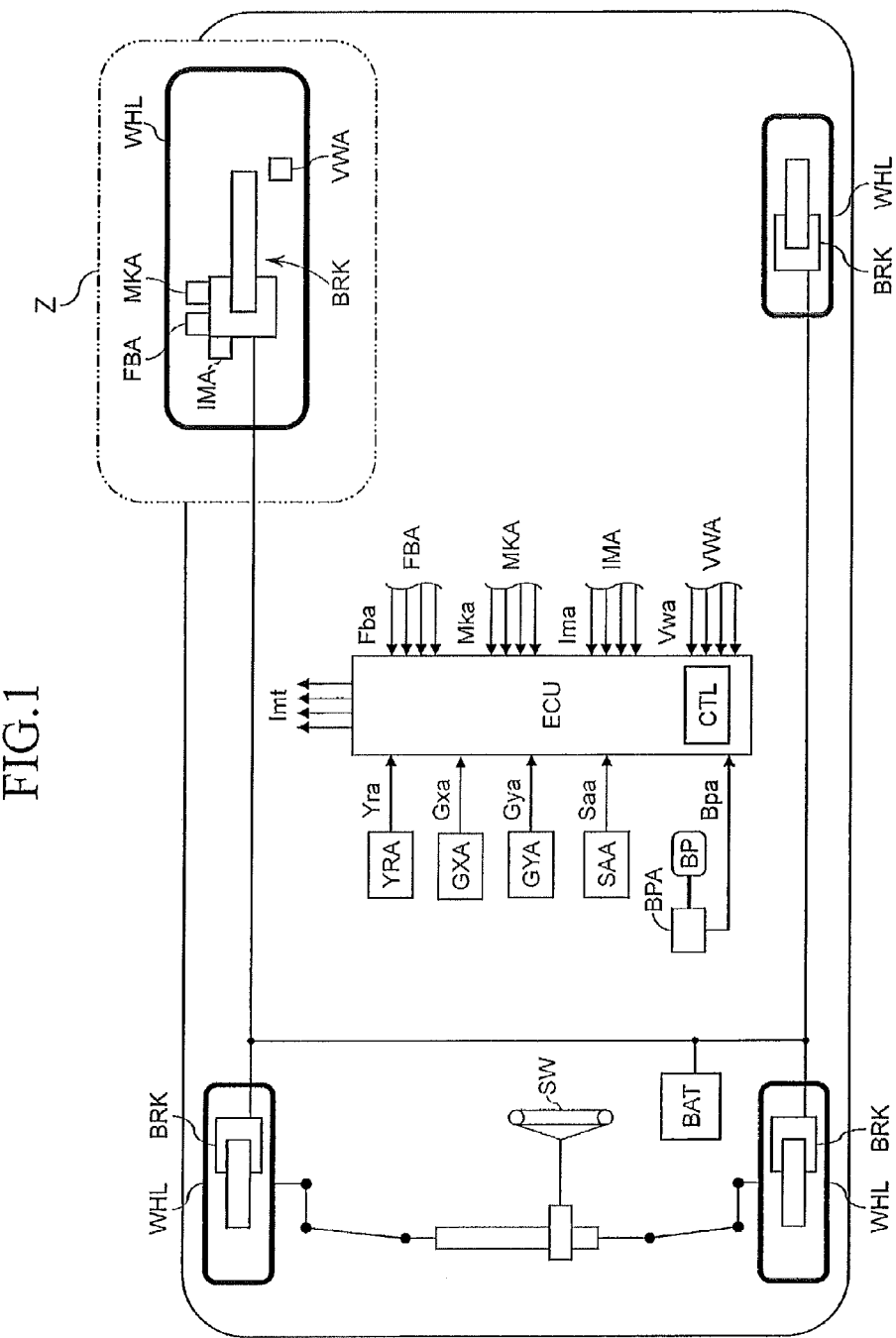
FIG. 1 is a schematic configuration diagram of a vehicle in which a brake control device according to embodiments of the present invention is mounted.

As illustrated in FIG. 1, this vehicle is equipped with a braking operation member (for example, brake pedal) BP that is used by a driver for decelerating the vehicle, braking means (brake actuator) BRK by which a braking torque of each wheel is adjusted to generate a braking force therefor, an electronic control unit ECU for controlling the BRK, and a battery BAT as a power source for supplying electric power to the BRK, the ECU, and the like.

In addition, this vehicle includes braking operation amount acquisition means (such as stroke sensor or leg-force sensor) BPA for detecting an operation amount Bpa of the BP, steering angle detection means SAA for detecting a steering angle Saa of a steering wheel SW operated by the driver, yaw rate detection means YRA for detecting a yaw rate Yra of the vehicle, longitudinal acceleration detection means GXA for detecting a vehicle longitudinal acceleration Gxa, lateral acceleration detection means GYA for detecting a vehicle lateral acceleration Gya, and wheel speed detection means VWA for detecting a rotation speed (wheel speed) Vwa of each wheel WHL.

The braking means BRK is equipped with an electric motor MTR (not shown) and the braking torque of the wheel WHL is controlled by the MTR. In addition, the BRK includes pressing force detection means (for example, axial force sensor) FBA for detecting a pressing force Fba of a friction member to press a rotating member, energization amount detection means (for example, current sensor) IMA for detecting an energization amount (for example, current value) Ima to the MTR, and position detection means (for example, rotation angle sensor) MKA for detecting the position (for example, rotation angle) Mka of the MTR.

The above-mentioned signals (such as Bpa) that are detected by the various detection means are subject to noise removal (reduction) filter (for example, low-pass filter) processing and then are supplied to the ECU. In the ECU, arithmetic processing for the brake control related to the present invention is executed. That is to say, control means CTL to be described later is programmed in the ECU, and a target energization amount (for example, target current value or target duty ratio) Imt for controlling the electric motor MTR is calculated based on the Bpa and the like. In addition, based on the Vwa, the Yra, and the like, in the ECU, arithmetic processing is executed for, for example, anti-skid control (ABS), traction control (TCS), and vehicle stabilization control (ESC) that are known.

<Configuration of Braking Means (Brake Actuator) BRK>

In the brake control device according to the present invention, the electric motor MTR generates and adjusts the braking torque of the wheel WHL.

Figure 2:
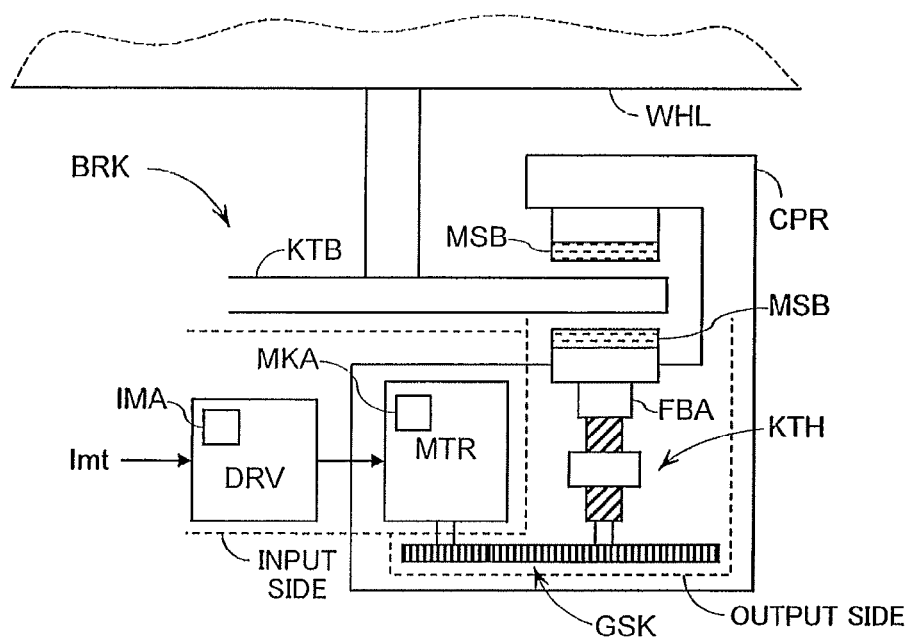
FIG. 2 is a diagram illustrating a configuration of braking means (brake actuator) (Z portion) illustrated in FIG. 1.

As illustrated in FIG. 2 that is an enlarged view of the Z portion of FIG. 1, the braking means BRK includes a brake caliper CPR, a rotating member KTB, a friction member MSB, the electric motor MTR, driving means DRV, a reducer GSK, a rotation/linear motion conversion mechanism KTH, the pressing force acquisition means FBA, the position detection means MKA, and the energization amount acquisition means IMA.

Similarly to the known braking device, the brake actuator BRK includes the brake caliper CPR that is known and the friction members (for example, brake pads) MSB. The MSBs are pressed against the rotating member (for example, brake rotor) KTB that is known to cause frictional forces, thereby generating a braking torque at the wheel WHL.

In the driving means (driving circuit of the electric motor MTR) DRV, based on the target energization amount (target value) Imt, an energization amount (finally, current value) to the electric motor MTR is controlled. Specifically, in the driving means DRV, a bridge circuit that uses power transistors (for example, MOS-FETs) is formed, and the power transistors are driven based on the target energization amount Imt to control the output of the electric motor MTR.

The output (output torque) of the electric motor MTR is transmitted, by way of the reducer (for example, gear sets) GSK, to the rotation/linear motion conversion mechanism KTH. Then, the KTH converts a rotation motion into a linear motion, and the linear motion urges the friction members (brake pads) MSB onto the rotating member (brake disc) KTB. The KTB is fixed to the wheel WHL, and the friction between the MSB and the KTB generates and adjusts the braking torque at the wheel WHL. As the rotation/linear motion conversion mechanism KTH, a sliding screw (for example, trapezoidal screw) that uses "sliding" for power transmission (sliding transmission) or a ball screw that uses "rolling" for power transmission (rolling transmission) is available.

The motor driving circuit DRV includes the energization amount acquisition means (for example, current sensor) IMA for detecting the actual energization amount (for example, actual current flowing to the electric motor) Ima. In addition, the electric motor MTR is equipped with the position detection means (for example, angle sensor) MKA for detecting the position (for example, rotation angle) Mka of the MTR. Further, the pressing force acquisition means (for example, force sensor) FBA is provided for acquiring (detecting) the force (actual pressing force) Fba with which the friction member MSB actually presses the rotating member KTB.

In FIG. 2, a so-called disc type braking device (disc brake) is illustrated as an exemplary configuration of the braking means BRK, but the braking means BRK may be in the form of a drum type braking device (drum brake). In the case of the drum brake, the friction member MSB is a brake shoe and the rotating member KTB is a brake drum. Similarly, the force with which the brake shoe presses the brake drum (pressing force) is controlled by the electric motor MTR. As the electric motor MTR, a device that generates a torque by rotation motion is exemplified, but a linear motor is available that generates a force by linear motion.

The brake actuator BRK is driven by the electric motor MTR. Therefore, a state quantity may be split between an input (energization amount) to the MTR and an output (output torque) from the MTR. A state quantity from the braking operation amount Bpa to the target energization amount Imt is referred to as an input-side state quantity (input state quantity) Svt. Specifically, the Imt is calculated based on (at least any one of) the input state quantities Svt. On the other hand, a state quantity from the output of the electric motor MTR to a pressing force of the friction members (brake pads) MSB on the rotating member (brake disc) KTB (that is, a state quantity indicating an actual actuating state of the movable member located in a power transmission path from the MTR to the MSB) is referred to as an output-side state quantity (output state quantity) Sva. The BRK is provided with acquisition means (detection means) SVA for acquiring (detecting) the output state quantity Sva.

A target to be controlled by the BRK is a braking torque on a wheel. Therefore, a "force" acting on the movable member located in the power transmission path from the output of the electric motor to the pressing force can be acquired (detected) by the above-mentioned acquisition means as an actual value. Moreover, by using a stiffness (spring constant) of the entire BRK, the "force acting on the movable member" can be calculated from the "position of the movable member". Therefore, the "position" of the movable member in the transmission path can be acquired (detected) by the above-mentioned acquisition means as the actual value. Specifically, by the above-mentioned acquisition means, the output-side state quantity is acquired as the actual value.

As a "target value corresponding to the actual value", a target value in the same physical quantity as the actual value is calculated. Specifically, the target position Mkt of the electric motor is calculated so as to correspond to the Mka, whereas the target value Fbt of the pressing force is calculated so as to correspond to the Fba. Further, a target torque corresponding to an actual output torque of the electric motor, a target thrust corresponding to an actual thrust in the KTH, a target position corresponding to the actual position in the KTH, or a target position corresponding to an actual position of the MSB can be adopted. The reference value is determined based on the target value, and therefore is in the same kind of physical quantity as the target value. The above-mentioned contents are summarized in Table 1.

TABLE 1

| Portion in power transmission path | | Output state quantity (actual value) Sva (collective denotation) | Acquisition means SVA (collective denotation) | Input state quantity (target value) Svt (collective denotation) |
|---|---|---|---|---|
| 1 | Electric motor MTR | Actual output (output torque) | Not shown | Target output (output torque) |
| 2 | | Actual position (rotation angle) Mka | MKA | Target position (rotation angle) Mkt |
| 3 | Reducer GSK | Actual transmission force (torque) | Not shown | Target transmission force (torque) |
| 4 | | Actual position (rotation angle) | Not shown | Target position (rotation angle) |
| 5 | Rotation/linear motion conversion mechanism KTH | Actual transmission force (thrust) | Not shown | Target transmission force (thrust) |
| 6 | | Actual position (stroke) | Not shown | Target position (stroke) |
| 7 | Friction member MSB | Actual pressing force Fba | FBA | Target pressing force Fbt |
| 8 | | Actual position (stroke) | Not shown | Target position (stroke) |

In each of the embodiments described below, the actual position Mka of the electric motor is used as the actual value, whereas the target position Mkt of the electric motor is used as the target value. As the actual value Sva and the target value Svt, at least any one of the actual values and at least any one of the target values of the portions in the output transmission path shown in Table 1 can be used.

<Overall Configuration of Control Means CTL>

Figure 3:
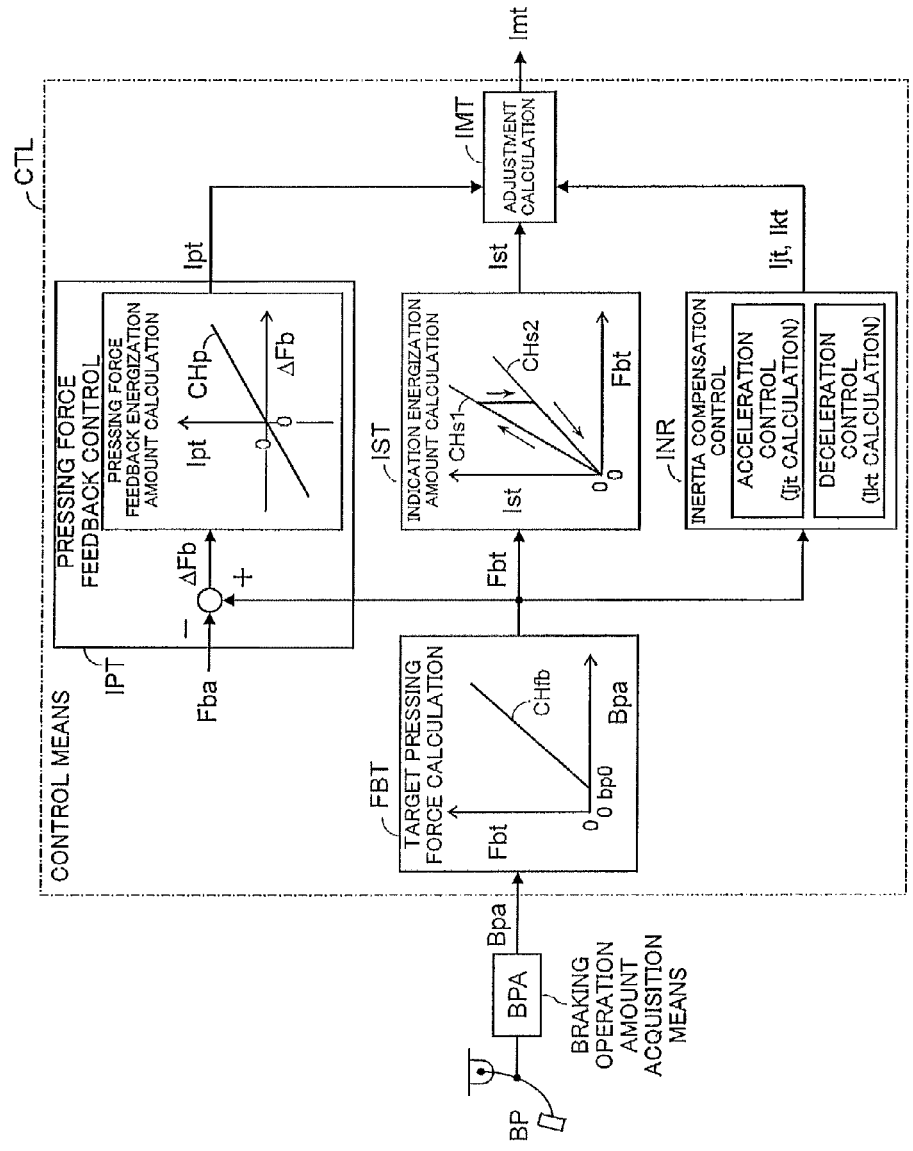
FIG. 3 is a functional block diagram illustrating control means (brake controller) illustrated in FIG. 1.

As illustrated in FIG. 3, the control means CTL that is illustrated in FIG. 1 includes a target pressing force calculation block FBT, an indication energization amount calculation block IST, a pressing force feedback control block IPT, an inertia compensation control block INR, and an energization amount adjustment calculation block IMT. The control means CTL is programmed in the electronic control unit ECU.

The operation amount Bpa of the braking operation member BP (for example, brake pedal) is acquired by the braking operation amount acquisition means BPA. The operation amount of the braking operation member (braking operation amount) Bpa is calculated based on at least one of an operation force of the braking operation member (for example, brake pedal force) operated by the driver or a displacement amount (for example, brake pedal stroke) thereof. The Bpa is subject to calculation processing using a low-pass filter or the like for noise component removal (reduction).

In the target pressing force calculation block FBT, a preset target pressing force calculation characteristic (calculation map) CHfb is used for calculating the target pressing force Fbt based on the operation amount Bpa. The "pressing force" is a force with which the friction member (for example, brake pad) MSB presses the rotating member (for example, brake disc) KTB in the braking means (brake actuator) BRK. The target pressing force Fbt is a target value of the pressing force.

The indication energization amount calculation block IST calculates, by using preset calculation maps CHs1 and CHs2, an indication energization amount Ist based on the target pressing force Fbt. The indication energization amount Ist is a target value of the energization amount to the electric motor MTR, which is used for driving the electric motor MTR of the braking means BRK to achieve the target pressing force Fbt. Taking into consideration of the hysteresis of the brake actuator, the calculation map (calculation characteristics for indication energization amount) has the two characteristics CHs1 and CHs2. The characteristic (first indication energization amount calculation characteristic) CHs1 is for coping with an increase of the pressing force, while the characteristic (second indication energization amount calculation characteristic) CHs2 is for coping with a decrease of the pressing force. For this reason, the characteristic CHs1 is set so as to output a relatively large indication energization amount Ist as compared to the characteristic CHs2.

As used herein, the energization amount is a state amount (variable) for controlling an output torque of the electric motor MTR. Due to the fact that the torque output from the electric motor MTR is almost in proportion to a current supplied thereto, a current target value of the electric motor is available as a target value of the energization amount. In addition, when a voltage supplied to the electric motor MTR is increased, the resultant current is increased, and hence a supply voltage value is available as the target energization amount. Moreover, a duty ratio in pulse width modulation (PWM) makes it possible to adjust the supply voltage value, and hence this duty ratio is available as the energization amount.

In the pressing force feedback control block IPT, a pressing force feedback energization amount Ipt is calculated based on the target pressing force (target value) Fbt and the actual pressing force (actual value) Fba. The indication energization amount Ist is calculated as a value that corresponds to the target pressing force Fbt, but an efficiency variation of the brake actuator may cause an error (steady error) between the target pressing force Fbt and the actual pressing force Fba. The pressing force feedback energization amount Ipt is calculated and determined to decrease the above-mentioned error (steady error) based on a deviation (pressing force deviation) ΔFb between the target pressing force Fbt and the actual pressing force Fba and a calculation characteristic (calculation map) CHp. The Fba is acquired by the pressing force acquisition means FBA.

In the inertia compensation control block INR, the influence of the inertia (inertia moment in rotation motion or inertia mass in linear motion) of the BRK (particularly, electric motor MTR) is compensated for. In the inertia compensation control block INR, target values Ijt and Ikt of the energization amount for compensating for the influence of the inertia (inertia moment or inertia mass) of the BRK are calculated. It is necessary to improve a responsiveness of pressing force generation in a case where the motion (rotation motion) of the electric motor is brought into acceleration from a state in which the electric motor is at rest or in motion at low speed. In such a case, the corresponding acceleration inertia compensation energization amount Ijt is calculated. The Ijt is a target value of the energization amount of the control during acceleration in the inertia compensation control.

In addition, in a case where the electric motor is brought into deceleration to stop from the state in which the electric motor is in motion (rotation motion), it is also necessary to improve the convergence by suppressing the overshoot of the pressing force. To cope with such a case, a deceleration inertia compensation energization amount Ikt is calculated. The Ikt is a target value of the energization amount of the control during deceleration in the inertia compensation control. As used herein, the Ijt is a value (a positive value added to the Ist) for increasing the energization amount to the electric motor, while the Ikt is a value (a negative value added to the Ist) for decreasing the energization amount to the electric motor.

Then, in the energization amount adjustment calculation block IMT, the indication energization amount Ist is adjusted by the pressing force feedback energization amount Ipt and the inertia compensation energization amount Ijt (during acceleration) or the inertia compensation energization amount Ikt (during deceleration), thereby calculating the target energization amount Imt. In detail, the indication energization amount Ist is added with the feedback energization amount Ipt and the inertia compensation energization amount Ijt or Ikt, and the resultant sum is calculated as the target energization amount Imt. The target energization amount Imt is a final target value of the energization amount for controlling the output of the electric motor MTR.

Configuration of Inertia Compensation Control Block of First Embodiment

Figure 4:
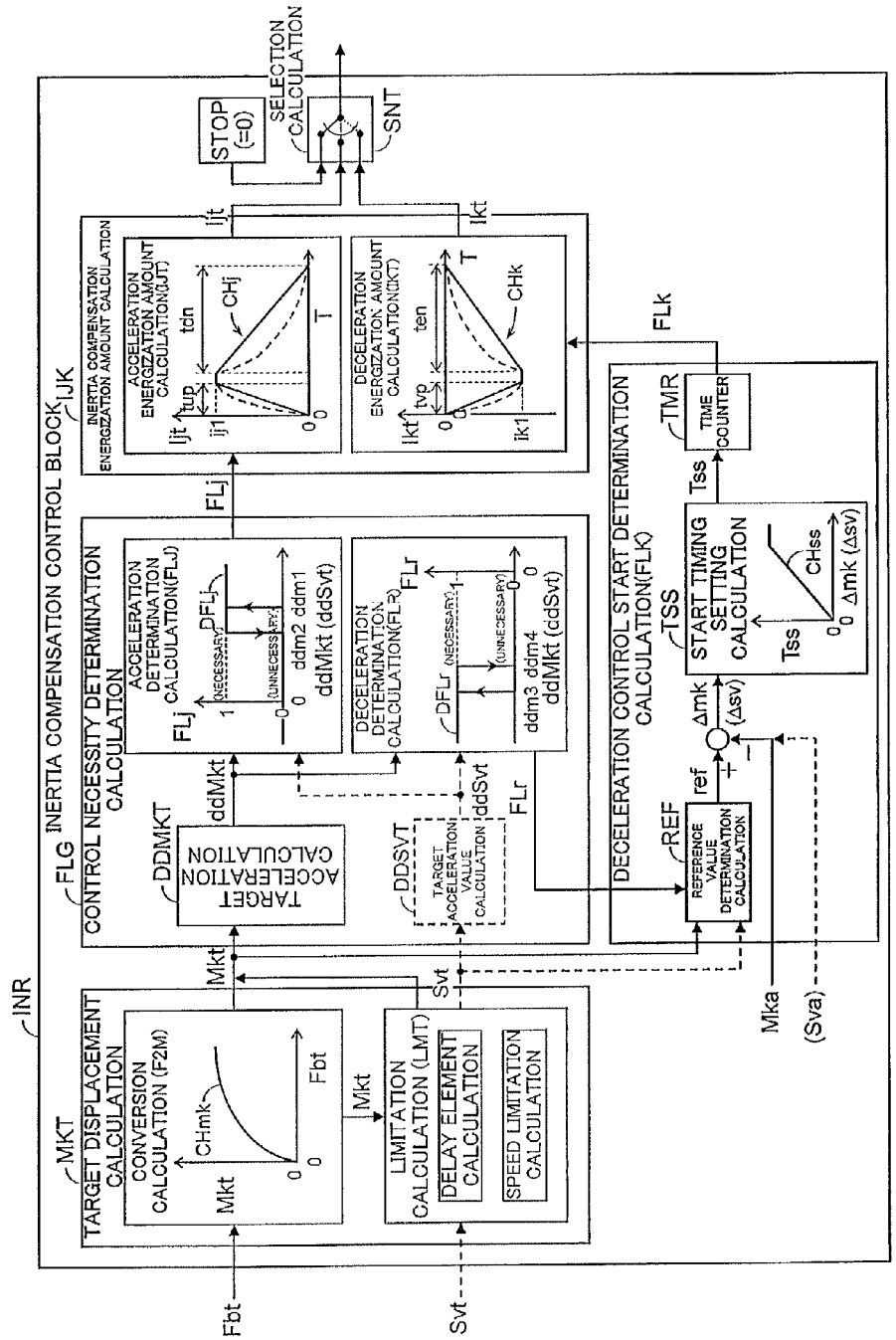
FIG. 4 is a functional block diagram illustrating an inertia compensation control block illustrated in FIG. 3 according to a first embodiment of the present invention.

With reference to FIG. 4, the inertia compensation control block INR according to a first embodiment of the present invention is described. As illustrated in FIG. 4, the inertia compensation control block INR of the first embodiment includes a target position calculation block MKT, a control necessity determination calculation block FLG, a deceleration control start determination calculation block FLK, an inertia compensation energization amount calculation block IJK, and a selection calculation block SNK.

The target position calculation block MKT includes a conversion calculation block F2M and a limitation calculation block LMT. In the F2M, the target position (target rotation angle) Mkt is calculated based on the target pressing force Fbt and a target pressing force calculation characteristic (calculation map) CHmk. The target position Mkt is a target value of the position (rotation angle) of the electric motor MTR. The calculation map CHmk shows a characteristic corresponding to a stiffness of the brake caliper CPR and the friction members (brake pads) MSB and is stored in advance in the electronic control unit ECU as a non-linear characteristic which is "concave-down".

In the LMT, a limitation of a maximum response of the BRK is placed for the Mkt. Specifically, a transient response of the BRK is taken into consideration by a delay element calculation, while a limitation is placed on a maximum speed of the electric motor by a speed limitation calculation.

Figure 5:
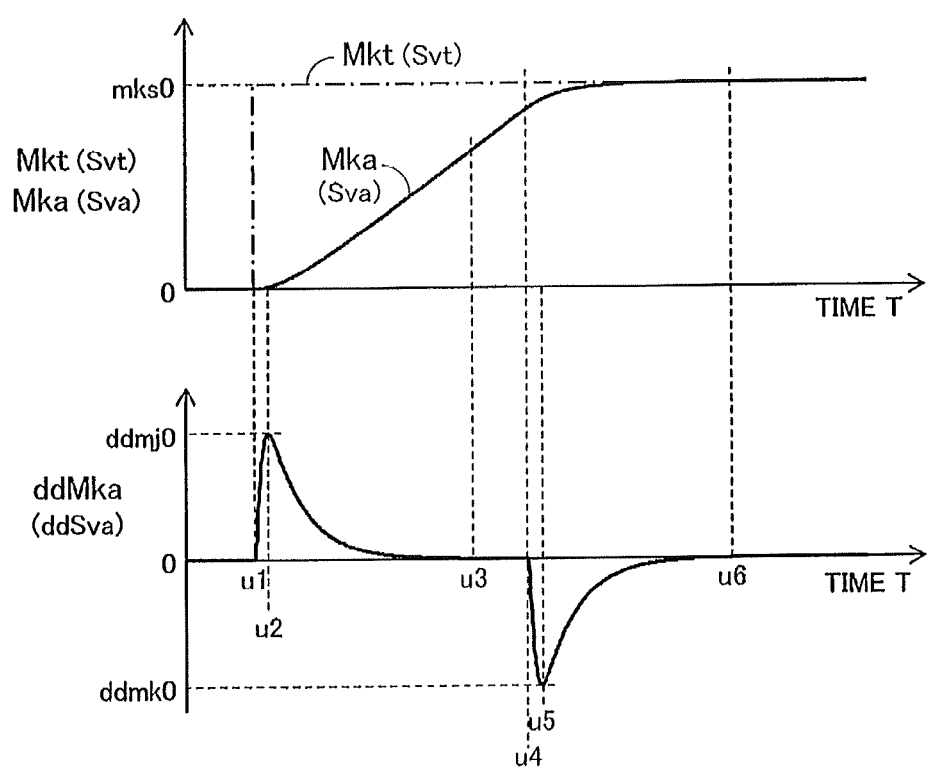
FIG. 5 is a graph showing a maximum response of the braking means (brake actuator).

The maximum response of the brake actuator BRK is described referring to FIG. 5. The maximum response of the BRK is maximum performance with which the BRK can make a response. When a step-input (target energization amount) is given to the electric motor MTR which drives the BRK, the output (the position of the electric motor) appears with a delay with respect to a change of the input. A maximum response (state of a temporal change amount of the output corresponding to a temporal change amount of the input) which can follow the step-input is defined as the "maximum response". Specifically, the maximum response is obtained based on a change of the actual value (output) Mka of the rotation angle when the (predetermined) target energization amount Imt is input in a stepwise manner (that is, the step-input in which the target value Mkt of the rotation angle is instantaneously increased to a predetermined amount mks0 is performed). The maximum response can also be obtained based on a change of the actual pressing force Fba with respect to the step-input. Based on a change of the Mka or Fba at the maximum response (step-response), a time constant τm, a dead time L, and the maximum speed described later are identified. By using the values described above, the delay element calculation and the speed limitation calculation are performed.

In the delay element calculation, based on the target position Mkt of the electric motor MTR, the target position Mkt that is the result of the delay element based calculation processing. In detail, the calculation processing that uses the delay element (for example, first-order delay element) that includes the time constant τm corresponding to the response of the brake actuator BRK (that is, the response of the electric motor MTR) is executed with respect to the target position Mkt of the electric motor, thereby calculating the post-delay process target position Mkt. By subjecting the Mkt to the delay processing, the response of the brake actuator BRK (state of a temporal change amount of the output corresponding to a temporal change amount of the input to the system) is considered as a transfer function with the delay element using the time constant, allowing to calculate the Mkt that is a target value corresponding to the response. As used herein, the transfer function is a function that is indicative of a relationship between inputs to the system (control system) and their corresponding outputs, and the time constant τm is a parameter that is indicative of the response speed of the delay element.

As the delay element, an n-th order delay element (n is an integer of "1" or more) is available. The delay element is represented in terms of Laplace transformation and, for example, in a case of the first-order delay element, a transfer function G(s) is represented by the following expression (1).

$$G(s)=K/(\tau m \cdot s+1) \quad (1)$$

Here, τm is a time constant, K is a constant, and s is Laplacian operator.

In addition, in a case where the delay element is a second-order delay element, the transfer function G(s) in the delay element calculation is represented by the following expression (2).

$$G(s)=K/\{s \cdot (\tau m \cdot s+1)\} \quad (2)$$

Moreover, in the delay element calculation, a dead time L may be considered. The dead time is a time period that is required until the output begins in response to the input. In such a case, the transfer function G(s) that is indicative of the response of the BRK is represented by the following expression (3) or expression (4).

Transfer function for delay element calculation using first-order delay and dead time:

$$G(s)=\{K/(\tau m \cdot s+1)\} \cdot e^{-L \cdot s} \quad (3)$$

Transfer function for delay element calculation using second-order delay and dead time:

$$G(s)=[K/\{s \cdot (\tau m \cdot s+1)\}] \cdot e^{-L \cdot s} \quad (4)$$

where L is the dead time, and e is Napierian number (the base of natural logarithms).

Further, in the speed limitation calculation, the maximum speed (maximum number of revolutions) of the electric motor is taken into consideration for the Mkt. Specifically, after the processing, a temporal change amount of the target position Mkt is limited to the maximum speed. Then, a new target position is calculated. After the delay element calculation and the speed limitation calculation are performed for the Mkt, the new target position Mkt (which is subjected to the response limitation) is output from the limitation calculation block LMT.

Referring to FIG. 4 again, in the control necessity determination calculation block FLG, whether or not the execution of the inertia compensation control is necessary is determined. The control necessity determination calculation block FLG includes an acceleration determination calculation block FLJ for determining the need during acceleration of the electric motor (for example, when the electric motor starts up to increase the speed) and a deceleration determination calculation block FLR for determining the need during deceleration of the electric motor (for example, when the electric motor decelerates to be gradually stopped). As the result of determination, a necessity determination flag FLj (during acceleration) or FLr (during deceleration) is output from the control necessity determination calculation block FLG. For the necessity determination flags FLj and FLr, "0" indicates the case where the inertia compensation control is unnecessary (unnecessary state), whereas "1" indicates the case where the inertia compensation control is necessary (necessary state).

The control necessity determination calculation block FLG includes a target acceleration calculation block DDMKT, the acceleration determination calculation block FLJ, and the deceleration determination calculation block FLR.

In the target acceleration calculation block DDMKT, based on the target position Mkt of the electric motor, an acceleration (target rotation angular acceleration) ddMkt thereof is calculated. The target acceleration ddMkt is calculated by finding the second-order differentiation of the Mkt. In other words, the Mkt is differentiated to calculate the target speed dMkt and then the target speed dMkt is differentiated, to thereby calculate the target acceleration ddMkt.

In the acceleration determination calculation block FLJ, it is determined, based on the ddMkt, when the inertia compensation control is carried out during acceleration of the electric motor MTR, which of the "necessary state (state in which the control is required to be executed)" and the "unnecessary state (state in which the control is not required to be executed)." The result of the determination is output as the necessity determination flag (control flag) FLj. "0" and "1" of the necessity determination flag FLj correspond to the "unnecessary state" and the "necessary state," respectively. In accordance with a calculation map DFLj, at a time point when the ddMkt exceeds a first predetermined acceleration (predetermined value) ddm1 (>0), the acceleration necessity determination flag FLj is switched from "0 (unnecessary state)" to "1 (necessary state)" (FLj←1). Thereafter, the FLj is switched from "1" to "0" (FLj←0) at a time point when the target acceleration ddMkt is less than a predetermined acceleration (predetermined value) ddm2 (<ddm1). Note that, the FLj is set to be "0" as an initial value in a case where the braking operation is not performed.

In the deceleration determination calculation block FLR, it is determined, based on the target acceleration ddMkt, when the inertia compensation control is carried out during deceleration of the electric motor MTR, which of the "necessary state (state in which the control is required to be executed)" and the "unnecessary state (state in which the control is not required to be executed)." The result of the determination is output as a necessity determination flag (control flag) FLr. "0" and "1" of the necessity determination flag FLr correspond to the "unnecessary state" and the "necessary state," respectively. In accordance with a calculation map DFLr, at a time point when the target acceleration ddMkt is less than a second predetermined acceleration (predetermined value) ddm3 (<0), the deceleration necessity determination flag FLr is switched from "0 (unnecessary state)" to "1 (necessary state)" (FLr←1). Thereafter, the FLr is switched from "1" to "0" (FLr←0) at a time point when the target acceleration ddMkt is equal to or more than a predetermined acceleration (predetermined value) ddm4 (>ddm3, <0). Note that, the FLr is set to be "0" as an initial value in a case where the braking operation is not performed.

Information on the necessity determination flags FLj and FLr for the inertia compensation control is transmitted from the control necessity determination calculation block FLG to the inertia compensation energization amount calculation block IJK and the deceleration control start determination calculation block FLK.

In the inertia compensation energization amount calculation block IJK, the inertia compensation energization amount (target amount) in the case where the control start is determined after it is determined in the FLG that the inertia compensation control is necessary. The inertia compensation energization amount calculation block IJK includes an acceleration energization amount calculation block IJT for calculating the inertia compensation energization amount Ijt during acceleration of the electric motor (for example, when the electric motor starts up to increase the speed) and a deceleration energization amount calculation block IKT for calculating the inertia compensation energization amount Ikt during deceleration of the electric motor (for example, when the electric motor decelerates to be stopped).

In the acceleration energization amount calculation block IJT, the acceleration inertia compensation energization amount (acceleration energization amount) Ijt is calculated based on the necessity determination flag FLj and the acceleration calculation characteristic (calculation map) CHj. The acceleration calculation characteristic CHj is stored in advance in the ECU as the characteristic (calculation map) of the Ijt relative to an elapsed time T since the acceleration inertia compensation control (acceleration control) is determined to be necessary. That is, the acceleration control starts when the control is determined to be necessary.

The calculation characteristic CHj is set so that the Ijt increases abruptly from "0" to a predetermined energization amount (predetermined value) ij1 along with time from the time T of "0" and thereafter decreases gently from the predetermined energization amount (predetermined value) ij1 to "0" along with time. In detail, in the CHj, a time period tup that is required for the Ijt to increase from "0" to the predetermined energization amount ij1 is set to be shorter than a time period tdn that is required for the Ijt to decrease from the predetermined energization amount ij1 to "0".

As illustrated in FIG. 4 with broken lines, in a case where the energization amount increases, it is possible to set the CHj so that the Ijt, which has a "concave-down" characteristic, first increases abruptly and thereafter increases gently. On the other hand, in a case where the energization amount decreases, it is possible to set the CHj so that the Ijt, which has a "concave-up" characteristic, first decreases abruptly and thereafter decreases gently. Then, the time point when the necessity determination flag FLj is switched from "0 (unnecessary state)" to "1 (necessary state)" is defined as an original time point (T=0) of the elapsed time in the CHj, and the inertia compensation energization amount during acceleration of the electric motor (acceleration energization amount) Ijt is determined based on the elapsed time T measured from the switched time point and the acceleration calculation characteristic CHj.

Even though the necessity determination flag FLj is switched from "1" to "0" in the calculation of the Ijt, the acceleration energization amount Ijt keeps being calculated over a continuation duration that is set in advance in the calculation characteristic CHj. Note that, the Ijt is calculated as a positive value and is adjusted to increase the energization amount to the electric motor MTR.

In the deceleration energization amount calculation block IKT, the deceleration inertia compensation energization amount (deceleration energization amount) Ikt is calculated based on the control start determination flag (start determination flag) FLk and the deceleration calculation characteristic (calculation map) CHk described later. The deceleration calculation characteristic CHk is stored in advance in the ECU as the characteristic (calculation map) of the Ikt relative to an elapsed time T since the control start is determined in the deceleration control start determination calculation block FLK after the deceleration inertia compensation control (deceleration control) is determined to be necessary in the IKT. The start determination of the deceleration control made by the FLK is described later.

The calculation characteristic CHk is set so that the Ikt decreases abruptly from "0" to a predetermined energization amount (predetermined value) ik1 along with time from the time T of "0" and thereafter increases gently from the predetermined energization amount (predetermined value) ik1 to "0" along with time. In detail, in the CHk, a time period tvp that is required for the Ikt to decrease from "0" to the predetermined energization amount ik1 is set to be shorter than a time period ten that is required for the Ikt to increase from the predetermined energization amount ik1 to "0".

As illustrated in FIG. 4 with broken lines, in a case where the energization amount decreases, it is possible to set the CHk so that the Ikt, which has a "concave-up" characteristic, first decreases abruptly and thereafter decreases gently. On the other hand, in a case where the energization amount increases, it is possible to set the CHk so that the Ikt, which has a "concave-down" characteristic, first increases abruptly and thereafter increases gently. Then, the time point when the start determination flag FLk, which is calculated in the FLK described later, is switched from "0" to "1" is defined as an original time point (T=0) of the elapsed time in the CHk, and the inertia compensation energization amount during deceleration of the electric motor (deceleration energization amount) Ikt is determined based on the elapsed time T measured from the switched time point and the deceleration calculation characteristic CHk.

Even though the start determination flag FLk is switched from "1" to "0" in the calculation of the Ikt, the Ikt keeps being calculated over a continuation duration that is set in advance in the calculation characteristic CHk. Note that, the Ikt is calculated as a negative value and is adjusted to decrease the energization amount to the electric motor MTR.

As used herein, the calculation characteristic CHj in the acceleration inertia compensation control and the calculation characteristic CHk in the deceleration inertia compensation control can be determined based on the above-mentioned maximum response from the braking means (brake actuator) BRK (see FIG. 5). In a case where the electric motor MTR is supplied with the (predetermined) target energization amount as a step input (thus, when the target value Mkt of the rotation angle is provided as a step input (of a predetermined amount mks0)), the actual value (output) Mka of the rotation angle changes to achieve the target value (input) Mkt (to follow the target value with a delay). The CHj and the CHk are determined based on the change of the Mka.

The torque that compensates for the inertia of the entire device (particularly, the inertia of the electric motor) is in proportion to the rotation angular acceleration of the electric motor. In consideration of this fact, for achieving the inertia compensation properly, the inertia compensation energization amount is calculated based on an actual acceleration (rotation angular acceleration) ddMka of the electric motor. For this reason, the acceleration (rotation angular acceleration) ddMka is calculated by subjecting the actual position (rotation angle) value Mka of the MTR to the second-order differentiation, and the CHj and CHk are determined based on the resultant ddMka. For example, it is possible to set the CHj and the CHk by multiplying the ddMka with a coefficient K (constant).

In the CHj, the increase gradient of the Ijt upon abrupt increase thereof (the gradient of the Ijt relative to time) is determined based on the maximum value or the average value of the increase gradient of the ddMka (the gradient of the ddMka that increases relative to time) between a time u1 when the step input starts and a time u2 when the rotation angular acceleration ddMka reaches its maximum value ddmj0. On the other hand, the decrease gradient of the Ijt upon gentle decrease thereof (the gradient of the Ijt relative to time) is determined based on the maximum value or the average value of the decrease gradient of the ddMka (the gradient of the ddMka that decreases relative to time) between the time u2 when the ddMka reaches its maximum value ddmj0 and a time u3 when the ddMka reaches almost zero.

In addition, based on the ddMka at the maximum response (step response) (based on the change of ddMka between the times u1 and u2), in a case where the energization amount increases, it is possible to set the CHj so that the Ijt, which has a "concave-down" characteristic, first increases abruptly and thereafter increases gently. Similarly, based on the ddMka at the maximum response (based on the change of ddMka between the times u2 and u3), in a case where the energization amount decreases, it is possible to set the CHj so that the Ijt, which has a "concave-up" characteristic, first decreases abruptly and thereafter decreases gently.

In the CHk, the decrease gradient of the Ikt upon abrupt decrease thereof (the gradient of the Ikt relative to time) is determined based on the minimum value or the average value of the decrease gradient of the ddMka (the gradient of the ddMka that decreases relative to time) between a time u4 when the ddMka begins to decrease from zero and a time u5 when the ddMka reaches its minimum value ddmk0. On the other hand, the increase gradient of the Ikt upon gentle increase thereof (the gradient of the Ikt relative to time) is determined based on the maximum value or the average value of the increase gradient of the ddMka (the gradient of the ddMka that increases relative to time) between the time u5 when the ddMka reaches its minimum value ddmk0 and a time u6 when the ddMka returns to almost zero.

In addition, based on the ddMka at the maximum response (step response) (based on the change of ddMka between the times u4 and u5), in a case where the energization amount decreases, it is possible to set the CHk so that the Ikt, which has a "concave-up" characteristic, first decreases abruptly and thereafter decreases gently. Similarly, based on the ddMka at the maximum response (based on the change of ddMka between the times u5 and u6), in a case where the energization amount increases, it is possible to set the CHk so that the Ikt, which has a "concave-down" characteristic, first increases abruptly and thereafter increases gently.

In the selection calculation block SNT, any one of the output of the inertia compensation energization amount Ijt during acceleration of the electric motor, the output of the inertia compensation energization amount Ikt during deceleration of the electric motor, and the output of control stop (output of value "0") is selected and output. In the selection calculation block SNT, in a case where the deceleration inertia compensation energization amount Ikt (<0) is output while the acceleration inertia compensation energization amount Ijt (>0) is being output, instead of the Ijt, the Ikt can be output with priority. With the above-mentioned configuration, when the driver stops the abrupt braking, the inertia compensation control during acceleration (calculation of the Ijt) is immediately stopped and is switched to the inertia compensation control during acceleration (calculation of the Ikt). In this manner, it is possible to positively suppress the overshoot of the pressing force.

In the deceleration control start determination calculation block FLK, whether or not to start the control is determined under the condition that it is determined in the FLR that the inertia compensation control during deceleration of the electric motor is in the "necessary state (FLr=1)". The FLK includes a reference value determination calculation block REF, a start timing setting calculation block TSS, and a time counter TMR.

In the REF, the reference value ref is calculated based on the necessity determination flag FLr during deceleration and the target position Mkt (corresponding to the target value) of the electric motor. Here, the reference value ref is a value serving as a reference for the determination of the start of the deceleration control. Specifically, the value of Mkt at a time point when the FLr is switched from "0 (unnecessary state)" to "1 (necessary state)" (FLr←1) is determined as the reference value ref. Then, a difference between the actual position Mka (corresponding to the actual value) of the MTR at the above-mentioned switching time and the reference value ref is calculated as a positional deviation Δmk.

In the TSS, a time period (start time period) Tss from the above-mentioned switching time to the time to start the deceleration control is set based on the positional deviation Δmk. Specifically, as the Δmk becomes larger, the Tss is set longer. Then, in the TMR, time from the above-mentioned switching time is counted. When the time period becomes equal to the Tss, the start of control is determined. At this time, the start determination flag FLk is switched from "0 (control stop state)" to "1 (control execution state)" (FLk←1). Specifically, after the elapse of the time period Tss from a time point when the necessary state of the deceleration control is determined, the deceleration control (calculation of the Ikt) is started.

As described above, in the inertia compensation control block INR of the first embodiment, the actual value Mka which is an actual motion of the electric motor is monitored. Based on the result of comparison between the actual value Mkt and the reference value ref determined from the target value Mkt calculated based on the operation amount Bpa, the inertia compensation control during deceleration is started. Therefore, excess and deficiency of the energization amount of the electric motor can be suppressed. As a result, the overshoot and undershoot of the braking torque on the wheel can be preferably reduced.

Configuration of Inertia Compensation Control Block of Second Embodiment

Figure 6:
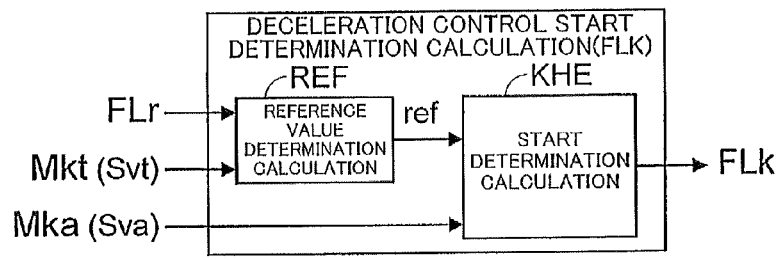
FIG. 6 is a functional block diagram illustrating an inertia compensation control block illustrated in FIG. 3 according to a second embodiment of the present invention.

Next, referring to FIG. 6, an inertia compensation control block INR according to second embodiment of the present invention is described. The inertia compensation control block INR of the second embodiment is the same as the first embodiment except for the deceleration control determination calculation block FLK. Now, only parts different from the first embodiment are described.

As illustrated in FIG. 6, the FLK of the second embodiment includes the reference value determination calculation block REF and a start determination calculation block KHE. In the REF, similarly to the case of the first embodiment, the target position (corresponding to the target value) Mkt at the time of determination of the necessary state of the deceleration control is determined as the reference value ref based on the FLr and the Mkt.

In the start determination calculation block KHE, at a time point when the actual position (corresponding to the actual value) Mka of the electric motor exceeds the reference value ref, the start determination flag FLk is switched from "0 (control stop)" to "1 (control execution)" and is then transmitted to the deceleration energization amount calculation block IKT (see FIG. 4). Specifically, at a time point when the actual position (actual value) Mka of the electric motor becomes larger than the reference value ref, the calculation of the deceleration energization amount Ikt is started. Then, the execution of the deceleration control is started.

When the Mka exceeds the ref, a transient motion state (state delayed with respect to the target value calculated based on the Bpa) of the electric motor is approaching a steady state (state in which a time delay of the actual value with respect to the target value is reduced so that the actual value becomes equal thereto). Therefore, by the configuration described above, the inertia compensation control during deceleration can be started at an appropriate timing.

Configuration of Inertia Compensation Control Block of Third Embodiment

Figure 7:
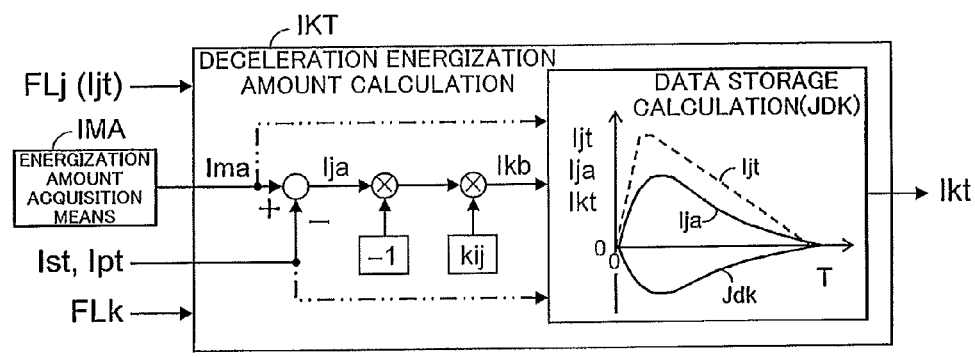
FIG. 7 is a functional block diagram illustrating an inertia compensation control block illustrated in FIG. 3 according to a third embodiment of the present invention.

Next, referring to FIG. 7, an inertia compensation control block INR according to third embodiment of the present invention is described. The inertia compensation control block INR of the third embodiment is the same as the first and second embodiments except for the energization amount acquisition means IMA and the deceleration energization amount calculation block IKT. Now, only parts different from the first and second embodiments are described.

Even when the acceleration inertia compensation energization amount Ijt is output as a value in which the responsiveness of the electric motor MTR is taken into consideration, the actual energization amount to the electric motor MTR does not always match the target value depending on a state of the power supply voltage (for example, when a voltage drops). For example, in a case where the actual energization amount is insufficient when the electric motor MTR starts up, if the preset deceleration inertia compensation energization amount Ikt is output, an insufficient pressing force may be generated in the brake actuator BRK. For this reason, in this embodiment, based on an actual energization amount (for example, current value) Ima that is acquired by the energization amount acquisition means (for example, current sensor) IMA, the deceleration inertia compensation energization amount Ikt can be calculated.

As illustrated in FIG. 7, the deceleration energization amount calculation block IKT is provided with a data storage calculation block JDK for storing the time-series data Jdk based on the actual energization amount Ima over the period in which the Ijt is output. The actual energization amount Ima is acquired by the energization amount acquisition means (for example, current sensor) IMA in correspondence to the inertia compensation energization amount Ijt during acceleration. The time-series data Jdk is stored in the data storage calculation block JDK, as the characteristics that indicate the actual energization amount Ija corresponding to the Ijt, with respect to the lapsed time T. Then, based on the time-series data Jdk, the deceleration inertia compensation energization amount Ikt is calculated.

In the deceleration energization amount calculation block IKT, first, the indication energization amount Ist and the feedback energization amount Ipt is removed (subtracted) from the actual energization amount Ima, thereby calculating the actual energization amount (actual value) Ija that corresponds to the inertia compensation energization amount (target value) Ijt during acceleration. In other words, the energization amount Ija that corresponds to the Ijt is calculated by removing a component resulted from the Ist and a component resulted from the Ipt from the Ima. Then, the corresponding energization amount Ija is multiplied by "−1" (inversion of sign) and further is multiplied by a coefficient kij, thereby calculating an energization amount Ikb that is stored in the data storage calculation block JDK.

In the data storage calculation block JDK, the storage energization amount Ikb is stored as the time-series data set Jdk in association with an elapsed time T from a time point (T=0) at which the acceleration control necessity determination flag FLj is transferred from "0 (unnecessary state)" to "1 (necessary state)" (that is, an elapsed time from the initiation of the inertia compensation control during acceleration). Further, the time-series data set Jdk based on the actual energization amount Ima serves as a characteristic (calculation map) for calculating the Ikt. Based on the elapsed time T from a time point (T=0) at which the deceleration control start determination flag FLk is transferred from "0 (control stop)" to "1 (control execution)" and the Jdk, the inertia compensation energization amount Ikt during deceleration is calculated.

While it is necessary to generate a torque for overcoming frictions at the bearings and the like of the electric motor MTR during acceleration (particularly, initiation) thereof, due to the fact that such frictions act on the MTR to decelerate during deceleration (when being intended to stopped), the coefficient kij may be set to be less than "1".

In the above descriptions, the storage energization amount Ikb is calculated every calculation period. Instead, it is possible to calculate the characteristic Jdk by storing values of the Ima, Ist, and Ipt that correspond to the elapsed time T as time-series data sets, and using those values. In other words, it is possible to determine the characteristic (calculation map) Jdk based on a calculation: the time-series data set of Jdk=(−1)×(kij)×{(the time-series data set of Ima)−(the time series data set of Ist)−(the time series data set of Ipt)}.

In the third embodiment, the inertia compensation control during deceleration is executed based on the actual energization amount Ima that is obtained in the execution of the inertia compensation control during deceleration. Therefore, the inertia compensation control during deceleration can be properly executed even when an error occurs between the target value and the actual value due to the influences of the power supply and the like.

Configuration of Inertia Compensation Control Block of Fourth Embodiment

Figure 8:
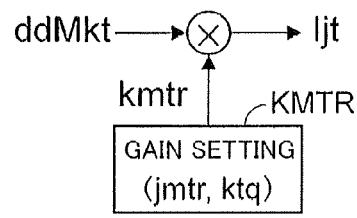
FIG. 8 is a functional block diagram illustrating an inertia compensation control block illustrated in FIG. 3 according to a fourth embodiment of the present invention.

Next, with reference to FIG. 8, an inertia compensation control block INR according to a fourth embodiment of the present invention is described. In the first embodiment, based on the result of necessity determination (calculation of the FLj) obtained from the target angular velocity ddMkt and the preset calculation characteristic CHj, the acceleration inertia compensation energization amount Ijt is calculated. On the other hand, in the fourth embodiment, the Ijt can be directly calculated from the ddMkt. Specifically, the FLJ and the IJT illustrated in FIG. 4 are replaced by a functional block illustrated in FIG. 8.

Specifically, the target angular velocity ddMkt is multiplied by a coefficient (gain) kmtr to calculate the acceleration energization amount Ijt. The coefficient (gain) kmtr is a constant for converting the target acceleration ddMkt into the energization amount of the electric motor and is stored in a gain setting block KMTR. The coefficient kmtr corresponds to a value obtained by dividing an inertia (constant) jmtr of the electric motor by a torque constant ktq of the electric motor.

Configuration of Inertia Compensation Control Block of Fifth Embodiment

Figure 9:
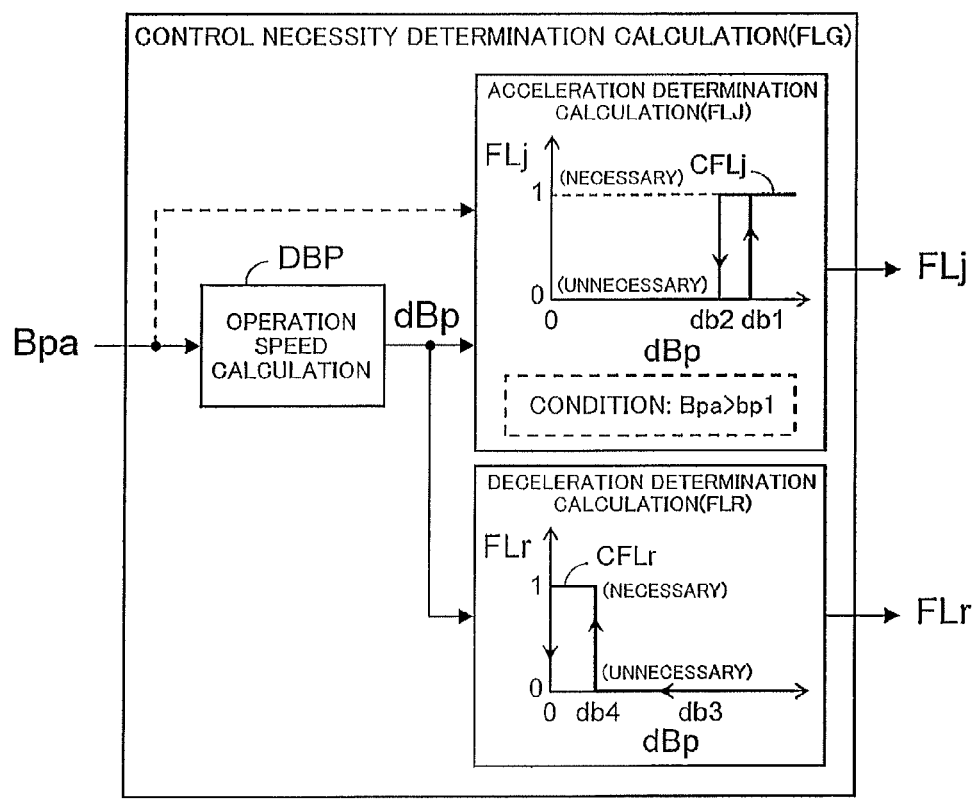
FIG. 9 is a functional block diagram illustrating an inertia compensation control block illustrated in FIG. 3 according to a fifth embodiment of the present invention.

Next, referring to FIG. 9, an inertia compensation control block INR according to a fifth embodiment of the present invention is described. The inertia compensation control block INR of the fifth embodiment is the same as the first to fourth embodiments except for the control necessity determination calculation block FLG. Now, only parts different from the first to fourth embodiments are described.

As illustrated in FIG. 9, in the control necessity determination calculation block FLG, whether or not the execution of the inertia compensation control is necessary is determined as in the case of the first to fourth embodiments described above. The determination can be made based on an operation speed dBp of the braking operation member BP. The necessity determination flag FLj (during acceleration) or FLr (during deceleration) is output as the result of determination from the FLG. For the necessity determination flags FLj and FLr, "0" indicates the case where the inertia compensation control is unnecessary (unnecessary state), whereas "1" indicates the case where the inertia compensation control is necessary (necessary state).

The control necessity determination calculation block FLG includes an operation speed calculation block DBP, the acceleration determination calculation block FLJ, and the deceleration determination calculation block FLR.

First, in the operation speed calculation block DBP, based on the operation amount Bpa of the braking operation member BP, an operation speed dBp of the braking operation member is calculated. The operation speed dBp is calculated by differentiating the Bpa.

In the acceleration determination calculation block FLJ, based on the operation speed dBp, it is determined whether the inertia compensation control is in "necessary state (state in which the control is required to be executed)" or in "unnecessary state (state in which the control is not required to be executed)" in the case where the electric motor accelerates (for example, in the case where the rotation speed of the electric motor increases). The determination result is output as the necessity determination flag (control flag) FLj. "0" and "1" of the necessity determination flag FLj correspond to "unnecessary state" and "necessary state", respectively. For the necessity determination of the inertia compensation control during acceleration, in accordance with the calculation map CFLj, at a time point when the dBp exceeds the predetermined operation speed (predetermined value) db1, the necessity determination flag Flj during acceleration is switched from "0 (unnecessary state)" to "1 (necessary state)" (FLj←1). Thereafter, at a time point when the dBp is less than the predetermined operation speed (predetermined value) db2, the necessity determination flag FLj is switched from "1" to "0" (FLj←0). Note that, the FLj is set to be "0" as an initial value in a case where the braking operation is not performed.

Further, for determining the necessity of the acceleration inertia compensation control, other than the operation speed dBp, the operation amount Bpa of the braking operation member is available. In such a case, at a time point when the Bpa exceeds the predetermined operation amount (predetermined value) bp1 and concurrently the dBp exceeds the predetermined operation speed (predetermined value) db1, the necessity determination flag FLj is switched from "0" to "1". The use of the condition of Bpa>bp1 as a determination criteria can compensate for the influences of the noise and other factors in the dBp, thereby enabling a reliable determination.

In the deceleration determination calculation block FLR, whether the inertia compensation control is in the "necessary state (state in which the control is required to be executed)" or the "unnecessary state (state in which the control is not required to be executed)" in the case where the electric motor decelerates based on the dBp (for example, in the case where the rotation speed of the electric motor decreases). The result of determination is output as the necessity determination flag (control flag) FLr. For the necessity determination flag FLr, "0" corresponds to the "unnecessary state", whereas "1" corresponds to the "necessary state". For the necessity determination of the inertia compensation control during deceleration, in accordance with the calculation map CFLr, at a time point when the dBp in a state of being equal to or larger than a predetermined operation speed (predetermined value) db3 becomes smaller than a predetermined operation speed (predetermined value) db4 (<db3), the necessity determination flag FLr is switched from "0 (unnecessary state)" to "1 (necessary state)" (FLr←1). Thereafter, in order to prevent the acceleration control and the deceleration control from being frequently repeated for the dBp, the predetermined operation speed db3 of the deceleration control can be set to a value smaller than the predetermined operation speed db1 of the acceleration control. The value of FLr is set to "0" as an initial value when the braking operation is not performed.

Information regarding the necessity determination flags FLj and FLr of the inertia compensation control is transmitted from the control necessity determination calculation block FLG.

<Functions and Effects>

Figure 10:
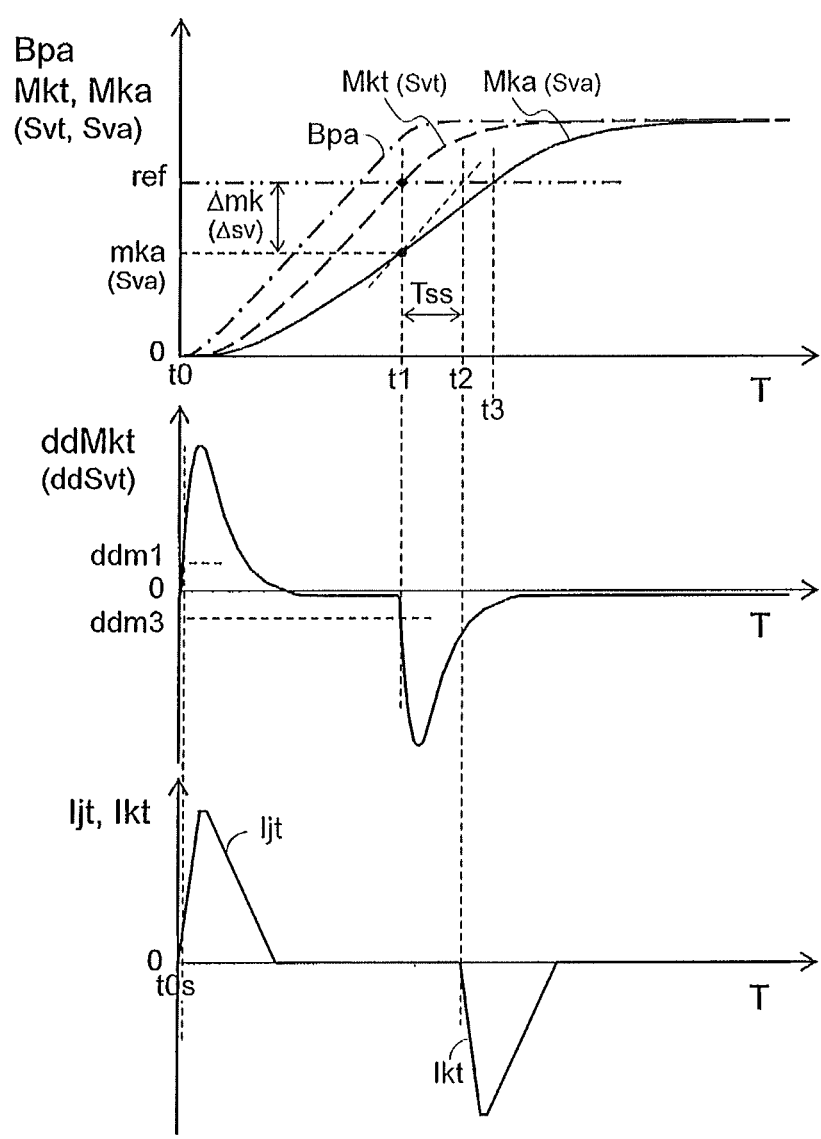
FIG. 10 is a time chart illustrating functions and effects of the brake control device according to the embodiments of the present invention.

Now, referring to FIG. 10, functions and effects common to the inertia compensation control in the inertia compensation control block INR of the embodiments are described. The inertia compensation control is control for adjusting the energization amount (Ijt, Ikt) corresponding to the force (torque) necessary for the movable portion (such as the MTR) of the device, which has the inertia, to perform the acceleration motion or the deceleration motion to the target energization amount Imt. Specifically, when the electric motor accelerates, the compensation (correction) is performed by increasing the target energization amount. When the electric motor decelerates, the compensation (correction) is performed by decreasing the target energization amount.

When the driver starts the braking operation at a time point t0, the braking operation amount Bpa acquired by the operation amount acquisition means BPA increases. Based on the Bpa (indicated by the alternate long and short dash line in FIG. 10), the target position Mkt of the electric motor is calculated. The delay element calculation and the limitation calculation are performed for the Mkt to calculate the final Mkt (indicated by the broken line in FIG. 10). By the delay element calculation (calculation using the time constant in consideration of the delay element and the dead time) and the limitation calculation (calculation for limitation to the maximum speed), the maximum response (response to the step-input, for example) of the BRK can be taken into consideration.

The target acceleration ddMkt is calculated by the second-order differentiation of the Mkt. At a time point when the ddMkt exceeds the predetermined acceleration (predetermined value) ddm1 (time point t0s), the need of the inertia compensation control (acceleration control) when the electric motor accelerates (during acceleration) is switched from the "unnecessary state" to the "necessary state" (specifically, the necessary state is determined). Then, the control is started. At a time point when the determination flag FLj of the acceleration control is switched from "0 (unnecessary state)" to "1 (necessary state)", the acceleration energization amount Ijt is output. By the Ijt, the target energization amount Imt is increased. As a result, the influences of the inertia during acceleration of the electric motor can be compensated for.

At a time point when ddMkt becomes smaller than the predetermined acceleration (predetermined value) ddm3 (time point t1), the need of the inertia compensation control (deceleration control) during deceleration is switched from the "unnecessary state" to the "necessary state" (that is, the necessary state is determined). At this time, the necessity determination flag FLr for the deceleration control is switched from "0 (unnecessary state)" to "1 (necessary state)" (FLr←1). At this time, however, the deceleration control is not started yet. The target value Mkt at a time point when the necessary state of the deceleration control is determined (determination time) is set as the reference value ref. Here, the reference value ref is a reference for starting the inertia compensation control (output of the Ikt) during deceleration. At the above-mentioned determination time (T=t1), the deviation Δmk between the reference value ref and the actual position (actual value) Mka of the electric motor is calculated. Based on the Δmk, the start time period Tss is set. The time counter starts incrementing at the above-mentioned determination time. At a time point t2 when the cumulative time period becomes equal to the Tss, the start determination flag FLk is switched from "0 (control stop state)" to "1 (control execution state)" (FLk←1). At the switching time, the deceleration control is started. Then, the deceleration energization amount Ikt is output. By the Ikt, the target energization amount Imt is decreased. As a result, the influences of the inertia in the case where the electric motor decelerates can be compensated for.

The inertia compensation control during deceleration (deceleration control) is required to be performed immediately before the motion state of the electric motor for generating the pressing force transitions from the transient state to the steady state. Further, when there is the difference between the target value Mkt for calculating the target energization amount Imt and the actual value Mka generated as a result thereof, the inertia compensation control during deceleration is important. The target value Mkt at the moment when the necessary state of the deceleration control is determined (FLr←1) is set as the reference value ref at the time of transition of the transient state to the steady state. Based on the reference value ref, a timing at which the actual value Mka transitions from the transient state to the steady state is predicted. Therefore, the inertia compensation control with no excess and deficiency in the energization amount of the electric motor can be started and executed at an appropriate timing before the actual value Mka transitions from the transient state to the steady state. As a result, the overshoot and undershoot of the braking torque can be reliably suppressed.

Moreover, at a time point t3 at which the actual value Mka exceeds the reference value ref, the deceleration control can be started. At this time, the start determination flag FLk is switched from "0 (control stop state)" to "1 (control execution state)". Then, the deceleration energization amount Ikt can be output. Even by the operation described above, as in the case described above, at the moment at which the necessary state of the deceleration control is determined (FLr←1), the reference value ref is set based on the target value Mkt. Based on the reference value ref, the inertia compensation control during deceleration is started. Therefore, the inertia compensation control with no excess and deficiency in the energization amount can be executed.

<Description of Target Value and Actual Value>

Now, some remarks on the "target value" and the "actual value" described above are added. In each of the embodiments described above, in the inertia compensation control, the target position Mkt of the electric motor is adopted as the target value, whereas the actual position Mka of the electric motor is adopted as the actual value. On the other hand, a state quantity from the output of the electric motor MTR to the pressing force of the friction members MSB on the rotating member KTB can be acquired (detected) as the actual value. Specifically, at least one of the "output state quantities (output-side state quantities)" shown in Table 1 can be acquired. In this case, the "output state quantity" is a physical quantity relating to at least any one of the "force" and the "position". The target to be controlled by the BRK is the braking torque on the wheel. Therefore, the output state quantity relating to the "force" (thrust (pressing force) or rotating force (torque)) is acquired as the actual value. For example, the actual output torque (rotating force) of the electric motor, the actual thrust in the KTH, or the actual pressing force Fba of the MSB can be adopted as the actual value.

The stiffness (spring constant) of the entire BRK including the brake caliper CPR and the like is known. Therefore, if the "position" is acquired (detected), the above-mentioned "force" can be calculated. Therefore, the output state quantity relating to the above-mentioned "position" can be acquired as the actual value. For example, the actual position (rotation angle) Mka of the electric motor, the actual position (stroke) in the KTH, and the actual position of the MSB can be adopted as the actual values. Moreover, the "force" and the "position" can be calculated after the conversion using the above-mentioned "stiffness". Therefore, the output state quantity (estimated value) relating to the "position", which is obtained by the conversion of the "force" or the output state quantity (estimated value) relating to the "force", which is obtained by the conversion of the "position", can also be used as the actual value. For example, a position estimated value Mks calculated from the Fba or a pressing force estimated value Fbs calculated from the Mka can be used as the actual value.

As the "target value corresponding to the actual value", the target value in the same physical quantity as the actual value is used. Table 1 shows the correspondence between the output state quantity (actual value) and the input state quantity (target value). Specifically, the target position Mkt of the electric motor, which corresponds to the Mka, or the target value Fbt of the pressing force, which corresponds to the Fba, is used. Further, the target torque corresponding to the actual output torque of the electric motor, the target thrust corresponding to the actual thrust in the KTH, the target position corresponding to the actual position in the KTH, or the target position corresponding to the actual position of the MSB can be adopted. The reference value ref is determined based on the target value (the target value at the time of FLr←1 is set to the ref), and therefore is in the same physical quantity as the target value.

Further, in each of the embodiments described above, the FLj or FLr is calculated based on the ddMkt in the control necessity determination calculation block FLG. A target acceleration value ddSvt calculated by the second-order differentiation of the target value Svt can be used. As in the case where the calculation for determination is performed based on the ddMkt, the necessity determination flag FLj or FLr for the inertia compensation control can be calculated based on the calculation characteristic DFLj or DFLr and the target acceleration value ddSvt.

Even in the case where the maximum response of the brake actuator BRK is to be obtained, the actual value Sva can be used in place of the Mka. The maximum response (step-response) is a change of the actual value Sva in the case where the target energization amount Imt is input in the stepwise manner (instantaneously increased to the predetermined value). Based on the change, the time constant τm, the dead time L, and the maximum speed can be determined.

Any one of the delay element calculation and the speed limitation calculation in the limitation calculation block LMT can be omitted. Moreover, the limitation calculation block LMT can be omitted. In this case, the Mkt can be directly transmitted from the F2M to the FLG and the FLK.

The invention claimed is:

1. A vehicle brake control device, comprising:
   operation amount acquisition means for acquiring an operation amount of a braking operation member for a vehicle by a driver;
   braking means for pressing a friction member against a rotating member fixed to a wheel of the vehicle through intermediation of an electric motor to generate a braking torque for the wheel;

control means for calculating a target energization amount based on the operation amount and controlling the electric motor based on the target energization amount; and acquisition means for acquiring, as an actual value, a state quantity indicating an actual actuation state of a movable member located in a power transmission path from the electric motor to the friction member, wherein the control means is configured to:
- determine, based on the operation amount, whether or not inertia compensation control for compensating for an influence of inertia of the braking means is necessary during deceleration in which a speed of the electric motor decreases;
- determine, as a reference value, a target value corresponding to the actual value, the target value being calculated based on the operation amount at a time of the determination that the inertia compensation control is necessary;
- calculate, based on the actual value and the reference value, an inertia compensation energization amount for decreasing the target energization amount to compensate for the influence of the inertia of the braking means; and
- adjust the target energization amount based on the inertia compensation energization amount.

2. A vehicle brake control device according to claim 1, wherein the control means is configured to:
- determine a time point to start the inertia compensation control based on a deviation between the actual value and the reference value at the time of the determination that the inertia compensation control is necessary; and
- start the adjustment of the target energization amount based on the inertia compensation energization amount when the time point to start the inertia compensation control arrives.

3. A vehicle brake control device according to claim 1, wherein the control means is configured to start the adjustment of the target energization amount based on the inertia compensation energization amount at a time point when the actual value exceeds the reference value.

4. A vehicle brake control device according to claim 1, wherein the acquisition means is configured to acquire, as the actual value, a physical quantity relating to at least one of a position of the movable member or a force acting on the movable member.

5. A vehicle brake control device according to claim 1, wherein the control means is configured to determine the target value based on a change pattern of the actual value, which is acquired in advance when step-input of the target energization amount to the electric motor is performed.

6. A vehicle brake control device according to claim 1, wherein the control means is configured to:
- calculate a target acceleration value by subjecting the target value to second-order differentiation; and
- determine that the inertia compensation control is necessary when an absolute value of the target acceleration value exceeds a predetermined value.

7. A vehicle brake control device according to claim 1, wherein the operation amount acquisition means comprises a stroke sensor or a leg-force sensor.

* * * * *